(12) United States Patent
Earl et al.

(10) Patent No.: US 11,777,628 B2
(45) Date of Patent: Oct. 3, 2023

(54) HITLESS PROTECTION FOR PACKET BASED DIGITIZED CLOCK DISTRIBUTION

(71) Applicant: Ciena Corporation, Hanover, MD (US)

(72) Inventors: John Andrew Earl, Ottawa (CA); David James Evans, Ottawa (CA); Daniel Claude Perras, Ottawa (CA); David Stuart, Almonte (CA)

(73) Assignee: Ciena Corporation, Hanover, MD (US)

( * ) Notice: Subject to any disclaimer, the term of this patent is extended or adjusted under 35 U.S.C. 154(b) by 78 days.

(21) Appl. No.: 17/533,888

(22) Filed: Nov. 23, 2021

(65) Prior Publication Data

US 2023/0163870 A1    May 25, 2023

(51) Int. Cl.
   *H04J 3/06*    (2006.01)
   *H04L 47/34*   (2022.01)
   *H04L 45/74*   (2022.01)

(52) U.S. Cl.
   CPC ............ *H04J 3/0661* (2013.01); *H04L 45/74* (2013.01); *H04L 47/34* (2013.01); *H04L 2212/00* (2013.01)

(58) Field of Classification Search
   CPC ....... H04J 3/0661; H04J 3/0667; H04L 45/74; H04L 47/34; H04L 2212/00; H04L 12/4633; H04L 45/50
   See application file for complete search history.

(56) References Cited

U.S. PATENT DOCUMENTS

| | | |
|---|---|---|
| 8,848,533 B1 | 9/2014 | Stuart et al. |
| 10,313,103 B1 | 6/2019 | Perras et al. |
| 10,396,972 B1 | 8/2019 | Gareau et al. |
| 10,594,395 B2 | 3/2020 | Abdullah et al. |
| 2002/0078076 A1 | 6/2002 | Evans |
| 2002/0087537 A1 | 7/2002 | Evans |
| 2002/0087935 A1 | 7/2002 | Vans et al. |
| 2004/0216122 A1 | 10/2004 | Gram et al. |
| 2006/0280182 A1* | 12/2006 | Williams ............ H04L 9/12 375/E7.278 |

(Continued)

OTHER PUBLICATIONS

The Institute of Electrical and Electronics Engineers, Inc., IEEE Computer Society, "IEEE Standard for Local and metropolitan area networks—Frame Replication and Elimination for Reliability," IEEE Std 802.1CB™—2017, pp. 1-102.

*Primary Examiner* — Wutchung Chu
(74) *Attorney, Agent, or Firm* — Baratta Law PLLC; Lawrence A. Baratta, Jr.

(57) ABSTRACT

A system includes a first module with a first clock; a second module with a second clock; and an Ethernet network interconnecting the first module and the second module by N Ethernet paths, N≥2; wherein the first module is configured to provide timestamps encapsulated in replicated Ethernet packets to the second module over each of the N Ethernet paths for redundancy. The first module can be configured to obtain timestamps from a first clock with each timestamp having a sequence identifier, replicate each timestamp and its sequence identifier, and encapsulate each replicated timestamp and its sequence identifier in an Ethernet packet and transmit each Ethernet packet over one of the N Ethernet paths. The second module can be configured to receive Ethernet packets over the N Ethernet paths; and utilize a first Ethernet packet with a given sequence identifier for synchronization of the second clock with the first clock.

18 Claims, 6 Drawing Sheets

(56) References Cited

U.S. PATENT DOCUMENTS

| | | | |
|---|---|---|---|
| 2013/0051407 A1* | 2/2013 | Fourcand | H04J 3/0602 370/514 |
| 2013/0132789 A1* | 5/2013 | Watford | H04L 1/08 714/752 |
| 2016/0173216 A1* | 6/2016 | Yang | H04L 45/24 370/350 |
| 2018/0034573 A1 | 2/2018 | Gareau et al. | |
| 2019/0007243 A1* | 1/2019 | Burbano | H04L 25/4902 |
| 2019/0068284 A1 | 2/2019 | Gareau et al. | |
| 2020/0280750 A1* | 9/2020 | Nakamura | H04L 65/764 |
| 2020/0322041 A1* | 10/2020 | Chao | H04W 12/106 |
| 2020/0396050 A1 | 12/2020 | Perras et al. | |
| 2021/0266085 A1 | 8/2021 | Evans et al. | |

\* cited by examiner

HITLESS PROTECTION FOR PACKET BASED DIGITIZED CLOCK DISTRIBUTION

FIELD OF THE DISCLOSURE

The present disclosure generally relates to networking and timing distribution. More particularly, the present disclosure relates to systems and methods for hitless protection of packet based digitized clock distribution.

BACKGROUND OF THE DISCLOSURE

A digitized/packetized clock is a sequence of packets that contain timestamps that represent a clock signal relative to a common reference clock, employing techniques to synthesize a clock that are very much like Differential Clock Recovery). There are 1+1 protection schemes in Ethernet where a detected failure of one link would cause the egress logic to start receiving packets from the other. Also, many solutions may simply enter a clock holdover mode and wait until the packet network reestablishes communication.

If protection is provided at the physical layer such as 1+1, then the egress needs to decide which link is the "working" link, and which link is the "protect." A failure then has to be detected in order for a switch from working to protect to happen. This process is not hitless from a packet perspective. Even though both links contain the same packet stream, some packets are inevitably lost during the switchover. This is better than no protection, as a switchover to an already established protected path would be shorter than calculating a new path from scratch. However, during this switchover, a brief holdover event would still occur due to the loss of timestamp information.

BRIEF SUMMARY OF THE DISCLOSURE

The present disclosure relates to systems and methods for hitless protection of packet based digitized clock distribution. The present disclosure includes a hitless protection layer on top of a packet based digitized clock distribution system. The protection scheme only requires the inclusion of a monotonic sequence identifier (ID) with each timestamp, and the replication of the timestamp sequence. The timestamp sequence can be replicated an arbitrary number of times to match the number of redundant paths available in the network. A "first to arrive" mechanism allows for hitless switchover between any number of redundant paths, and simplifies the management of the protected digitized clock, as no specific path needs to be nominated as a working or protect path. This overcomes the shortcomings of a typical 1+1 protection scheme by also establishing redundancy at the source of the timestamps, as opposed to only on the links. By providing a monotonic sequence ID, creating a copy, and sending each copy via multiple network paths that arrive at the same destination, the destination can determine which timestamp arrived first, and can discard the second. When a failure occurs, the destination does not have to detect this and switchover. It will simply stop seeing time stamps from the failed link, and continue to use the ones arriving on the working link. An example use case is for timing distribution between modules in a disaggregated network element; of course, other embodiments are also contemplated.

In an embodiment, a system includes a first module with a first clock; a second module with a second clock; and an Ethernet network interconnecting the first module and the second module by N Ethernet paths, N≥2; wherein the first module is configured to provide timestamps encapsulated in replicated Ethernet packets to the second module over each of the N Ethernet paths for redundancy. The first module can be configured to obtain timestamps from a first clock with each timestamp having a sequence identifier, replicate each timestamp and its sequence identifier, and encapsulate each replicated timestamp and its sequence identifier in an Ethernet packet and transmit each Ethernet packet over one of the N Ethernet paths.

The first module can be configured to obtain timestamps from a first clock with each timestamp having a sequence identifier, replicate each timestamp and its sequence identifier, and encapsulate each replicated timestamp and its sequence identifier in an Ethernet packet with different encapsulation headers and transmit each Ethernet packet over one of the N Ethernet paths. The second module can be configured to receive Ethernet packets over one or more of the N Ethernet paths; and utilize a first Ethernet packet with a given sequence identifier for synchronization of the second clock with the first clock. The second module can be configured to discard subsequent Ethernet packets with the given sequence identifier, wherein the subsequent Ethernet packets arrive after the first Ethernet packet.

The Ethernet network can include underlying protection in addition to the replicated Ethernet packets. The system can include a disaggregated network element. Each of the N Ethernet paths can be non-overlapping and physically exclusive. Each of the N Ethernet paths can have a latency less than a sampling period of the timestamps.

In another embodiment, a method of digitized clock distribution includes steps of, at a first module, obtaining timestamps from a first clock with each timestamp having a sequence identifier; replicating each timestamp and its sequence identifier; and encapsulating each replicated timestamp and its sequence identifier in an Ethernet packet either having a same encapsulation header and a different encapsulation header, and transmitting each Ethernet packet over one of N Ethernet paths in an Ethernet network, N≥2.

The steps can further include at a second module, receiving Ethernet packets over one or more of the N Ethernet paths; and utilizing a first Ethernet packet with a given sequence identifier for synchronization of a second clock with the first clock. The steps can further include, at the second module, discarding subsequent Ethernet packets with the given sequence identifier, wherein the one or more Ethernet packets arrive after the first Ethernet packet. The Ethernet network can include underlying protection in addition to the replicating.

The first module and the second module can be included in a disaggregated network element. Each of the N Ethernet paths can be non-overlapping and physically exclusive. Each of the N Ethernet paths can have a latency less than a sampling period of the obtaining.

In a further embodiment, a system includes circuitry configured to obtain timestamps from a first clock with each timestamp having a sequence identifier, replicate each timestamp and its sequence identifier, and encapsulate each replicated timestamp and its sequence identifier in an Ethernet packet either having a same encapsulation header and a different encapsulation header, and transmitting each Ethernet packet over one of N Ethernet paths in an Ethernet network, N≥2.

The system can further include second circuitry configured to receive Ethernet packets over one or more of the N Ethernet paths, and utilize a first Ethernet packet with a given sequence identifier for synchronization of a second clock with the first clock. The second circuitry can be further configured to discard subsequent Ethernet packets with the given sequence identifier, wherein the one or more Ethernet packets arrive after the first Ethernet packet. The Ethernet network can include underlying protection in addition to the replicating.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

The present disclosure relates to systems and methods for hitless protection of packet based digitized clock distribution. The present disclosure includes a hitless protection layer on top of a packet based digitized clock distribution system. The protection scheme associates a sequence ID with each generated timestamp and replicates each timestamp/sequence ID pair. The timestamp/sequence ID pair can be replicated a number of times to match the number of redundant paths available in the network. Each copy of the timestamp/sequence ID pair is encapsulated in a packet and transmitted to the destination over a different path. A "first to arrive" mechanism allows for hitless switchover between any number of redundant paths, and simplifies the management of the protected digitized clock, as no specific path needs to be nominated as a working or protect path. This overcomes the shortcomings of a typical 1+1 protection scheme by avoiding the need for a switchover in the event of a path failure. By providing a monotonic sequence ID, creating a copy, and sending each copy via multiple network paths that arrive at the same destination, the destination can determine which timestamp arrived first, and can discard the second. When a failure occurs, the destination does not have to detect this and switchover. It will simply stop seeing time stamps from the failed link, and continue to use the ones arriving on the working link. An example use case is for timing distribution between modules in a disaggregated network element; of course, other embodiments are also contemplated.

Background

Figure 1:
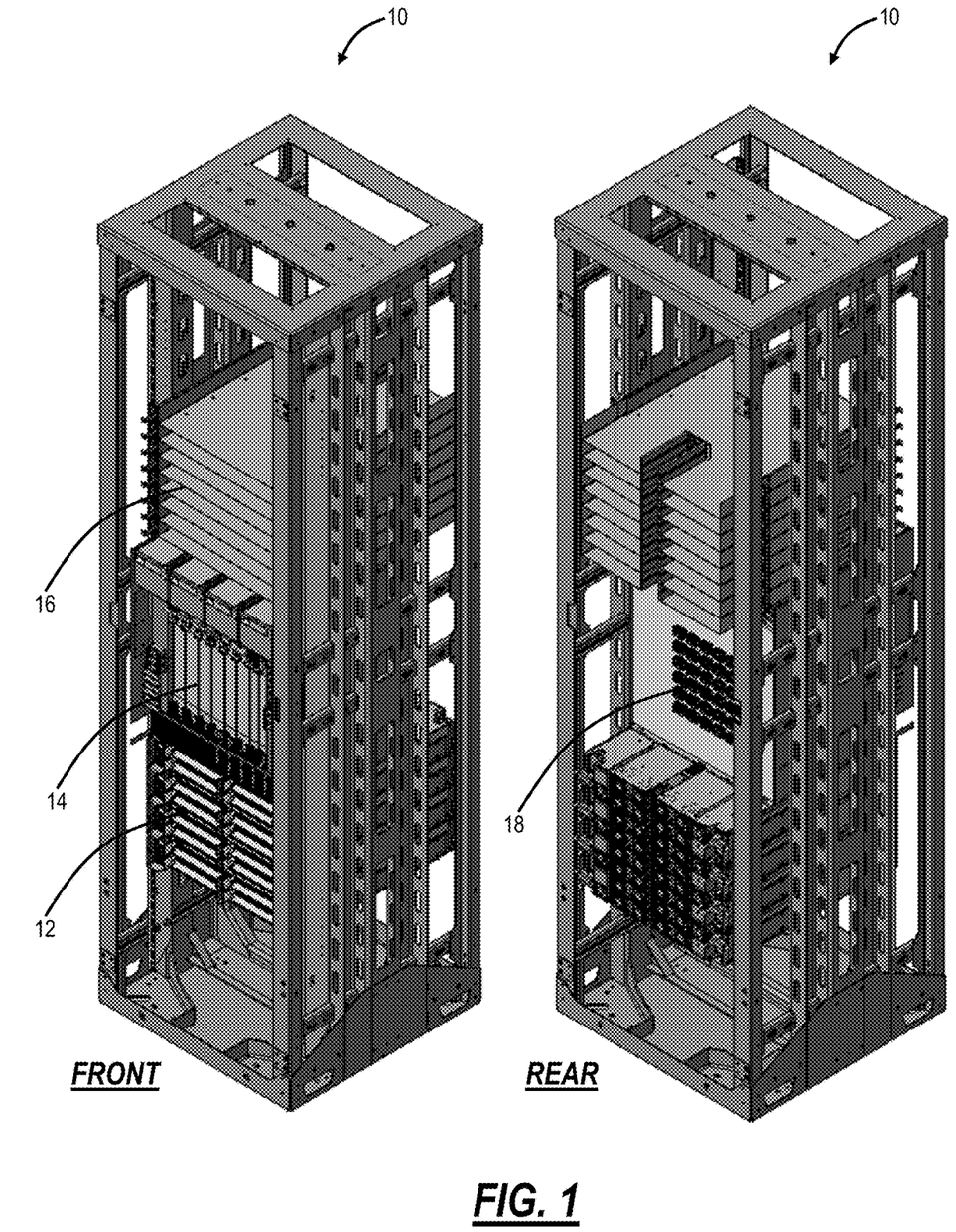
FIG. 1 is a diagram of an example distributed, disaggregated network element.

Networks, such as packet and optical networks, are physically implemented by network elements that can include, e.g., shelves, chassis, rack-mounted units ("pizza boxes"), housings, and the like. Conventionally, network elements use a backplane for communication between modules, cards, plugs, blades, etc. (herein collectively referred to as modules). Each network element is required to synchronize the timing of its output ports with a reference clock that is often selected and derived from one of its input ports. A typical network element can recover a clock from any selected port on any Interface Module. This recovered clock can be sent to a control module via a backplane signal, where it can be selected as a reference clock for other ports in the network element. The control module can distribute the resulting reference clock to every interface module via a backplane signal. This clock can be used as a transmit reference for every port on the interface module Newer network elements are disaggregated, meaning there are no backplane connections which could be used to carry reference clock signals between the multiple housings (modules). The only connection between housings can be an Ethernet ring. A distributed, disaggregated network element is one where modules interconnect to one another via cables (optical and/or electrical), instead of a backplane. FIG. 1 is a diagram of an example distributed, disaggregated network element 10. In this example, the network element 10 includes line modules 12, switch modules 14 that are in a chassis, and carriers 16. The line modules 12 can connect via cables to connectors 18 on the rear of the network element 10. An example disaggregated network element is described in U.S. patent application Ser. No. 15/959,746, filed Apr. 23, 2018, and entitled "Modular network element architecture," the contents of which are incorporated by reference. Those skilled in the art will recognize this is an example of a distributed, disaggregated network element; other embodiments are contemplated.

Reference clocks from a single central control module still need to be distributed to every port in the system. Similarly, recovered clocks from selected ports need to be sent back to the central control module. Since the connections between housings are ethernet only, clocks cannot be sent as physical clock signals. A highly accurate system clock is distributed between modules as accurately as possible using 1588-like techniques, such as described in U.S. patent application Ser. No. 17/376,232, filed Jul. 15, 2021, and entitled "Tolerant PCS for accurate timestamping in disaggregated network elements and synchronization method," the contents of which are incorporated by reference. The system clock establishes a common time base, which is used to digitize physical clocks by encoding them as a sequence of timestamps that represent the phase and frequency of the original clock relative to the common time base. This sequence of timestamps is referred to as a digitized clock.

Each timestamp is individually encapsulated in an Ethernet packet and sent between housings via the Ethernet ring. At the destination, timestamps are decapsulated from received packets. The sequence of received timestamps that make up a digitized clock are compared against the common time base to determine the phase and frequency of the original clock, and a physical clock is synthesized. In principle, this process of clock digitization is similar to Differential Clock Recovery. The main difference is a typical DCR implementation recovers a clock that is associated with a CBR data stream. In this application, there is no data stream associated with the clock.

Timing Integrated Circuit (IC) vendors have recently begun to provide timing solutions which are designed for packet-based clock distribution. The advantages of packet-based vs traditional point to point wired clock distribution include the ability to scale the number of clocks without increasing the number of physical signaling wires as well as the ability to flexibly route and reroute clocks within a system without requiring analog multiplexers or fanout buffers and without regard for wiring delays.

Figure 2:
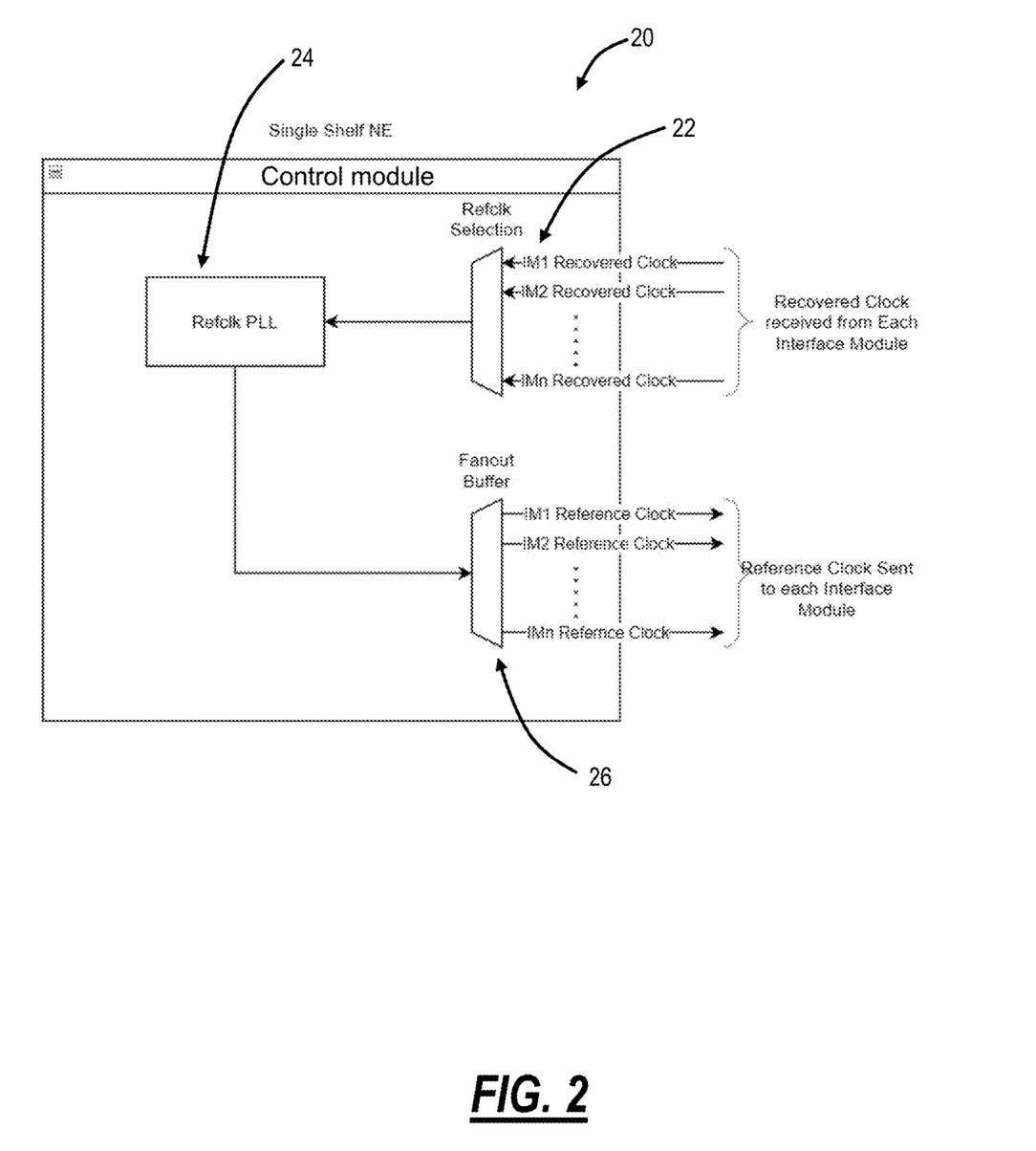
FIG. 2 is a diagram of a high-level view of reference clock distribution in a single shelf network element, via a control module.

FIG. 2 is a diagram of a high-level view of reference clock distribution in a single shelf network element, via a control module 20. The control module 20 communicates with other modules in the network element via a backplane. A reference clock selector 22 is configured to receive recovered clocks from each interface module, and to provide an input to a reference clock Phase Lock Loop (PLL) 24. The reference clock PLL 24 provides an output to a fanout buffer 26 that sends the reference clock to each interface module. A system where physical clocks are distributed directly on board wired traces (backplane) is expected to be highly reliable in this regard, as the system is self-contained and these individual wired traces are unlikely to fail randomly.

Figure 3:
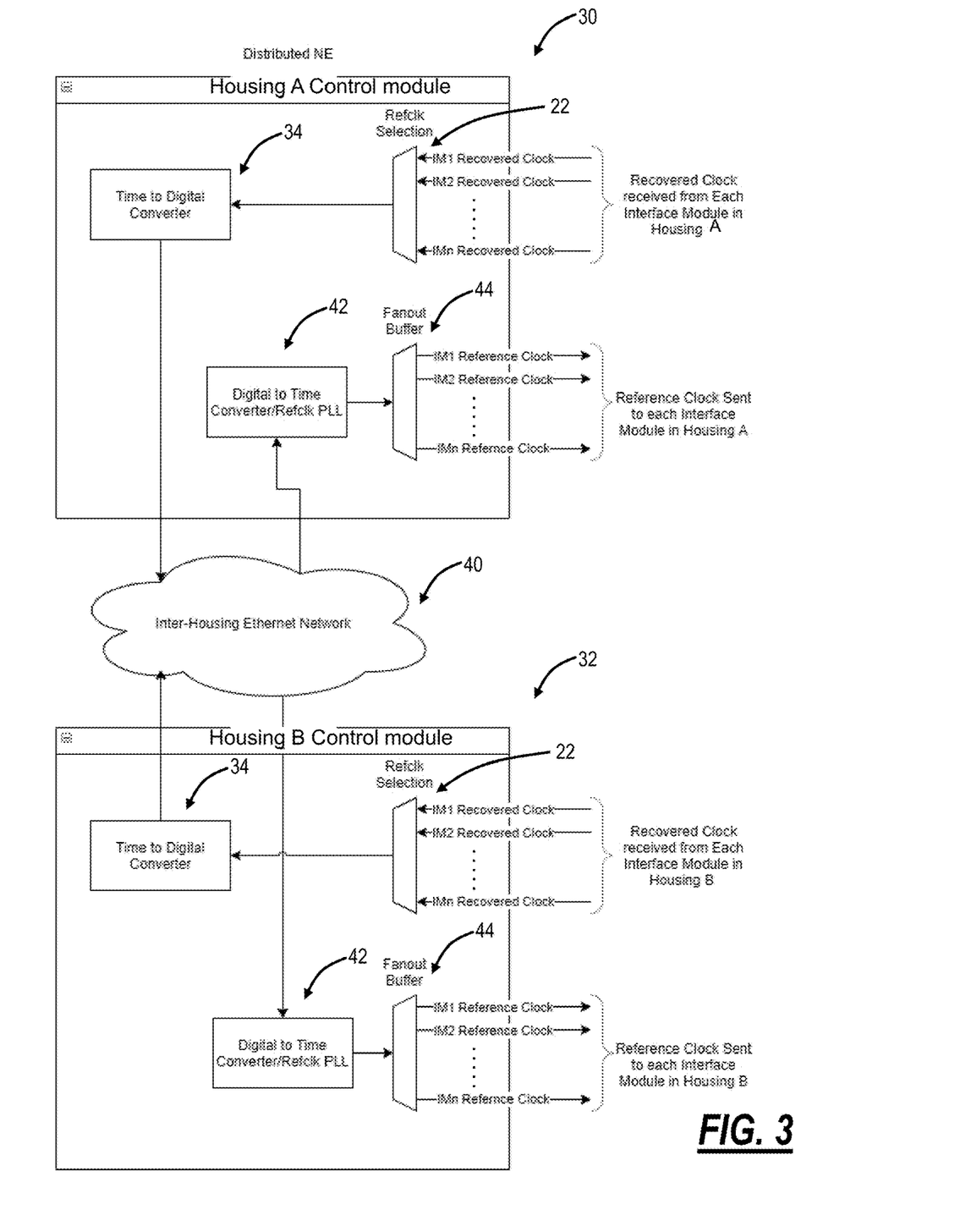
FIG. 3 is a diagram of a high-level view of reference clock distribution in a disaggregated network element using digitized clocking, via two control modules.

Reference Clock Distribution in a Disaggregated Network Element Using Digitized Clocking FIG. 3 is a diagram of a high-level view of reference clock distribution in a disaggregated network element using digitized clocking, via two control modules 30, 32. Of note, a disaggregated network element could have any number of control modules 30, 32. Each module 30, 32 includes a reference clock selector 22 is configured to receive recover clocks from each interface module that it is connected to. For example, the control module 30 can be associated with a housing A and the control module 32 can be associated with a housing B. The reference clock selector 22 provides an input to a time-to-digital converter circuit 34, which can communicate to a digital-to-time converter/reference clock PLL 42 via an inter-housing Ethernet network 40. The digital-to-time converter/PLL 42 connects to a fan-out buffer 44 that sends the reference clock to each interface module.

When clocks are being distributed as packets on an external Ethernet link, i.e., the inter-housing Ethernet network 40, there are more opportunities for failures to occur. There is some redundancy built into the system since the housings can be connected via a ring or leaf-spine network or any network architecture that provides redundancy. However, a single failure between housings means that clock packets will be lost in transit, and the destination will receive no clock packets until the network has rearranged to find an alternate path to the endpoint. This will result in an extended period where the input reference clock is no longer being tracked by the output reference clock, which enters a holdover mode. This causes the output reference clock, as well as any downstream NEs, to drift with respect to the rest of the network.

Digitized Clock Distribution without Protection

Figure 4:
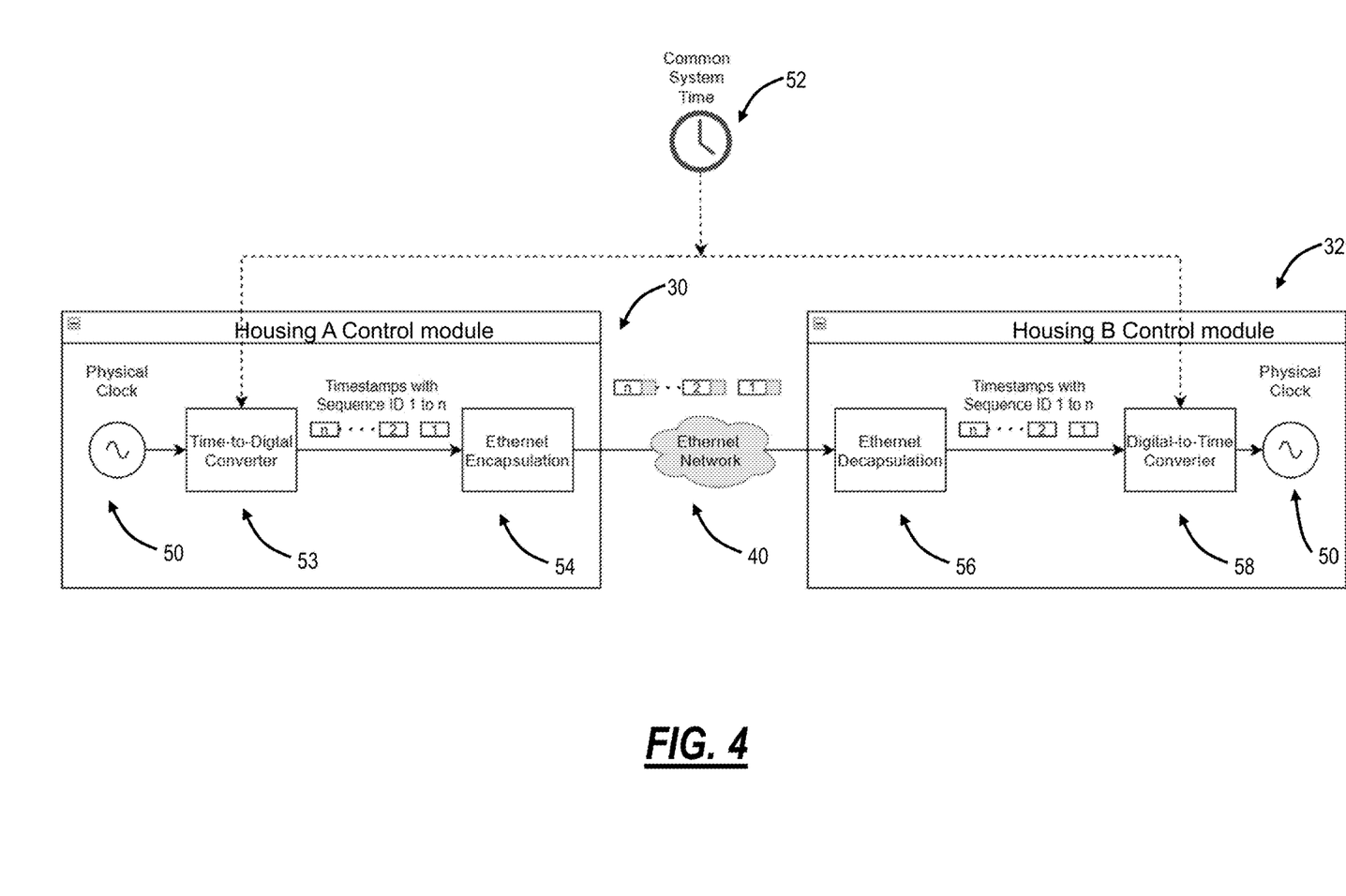
FIG. 4 is a diagram of digitized clock distribution between the control modules in the disaggregated network element without protection.

FIG. 4 is a diagram of digitized clock distribution between the control modules 30, 32 in the disaggregated network element without protection. For illustration purposes, FIG. 4 describes digitized clock distribution, via Ethernet packets, over the Ethernet network 40, from the control module 30 to the control module 32. Of course, a practical embodiment could be the other direction and the hardware and functions described in FIG. 4 in each of the control modules 30, 32 can be included in both the modules 30, 32.

Each of the control modules 30, 32 include a physical clock 50 that is being digitized. In this example in FIG. 4, the control module 30 is sending its timestamps to the control module 32. The control module 30 includes a time-to-digital converter circuit 53 that connects to the physical clock 50 and provides timestamps with sequence identifiers to an Ethernet encapsulation circuit 54. The Ethernet encapsulation circuit 54 is configured to send the timestamps with sequence identifiers in packets over the Ethernet network 40 to the control module 32.

The control module 32 includes an Ethernet decapsulation circuit 56 that receives the packets, extracts the timestamps with sequence identifiers, and provides them to a digital-to-time converter circuit 58. The digital-to-time converter circuit 58 regenerates the physical clock 50 in the control module 32 using the information in the timestamps for synchronizing to the clock 50 in the control module 30.

Digitized Clock Distribution with Protection

The proposal is to apply a layer of protection on digitized clock packets in order to maintain reference clock tracking and avoid clock holdover periods despite network link failures and/or packet loss. Again, the disaggregated network element of FIG. 3 is an example use case, and those skilled in the art will recognize this approach is equally applicable to any digitized clock distribution over different links for protection.

Figure 5:
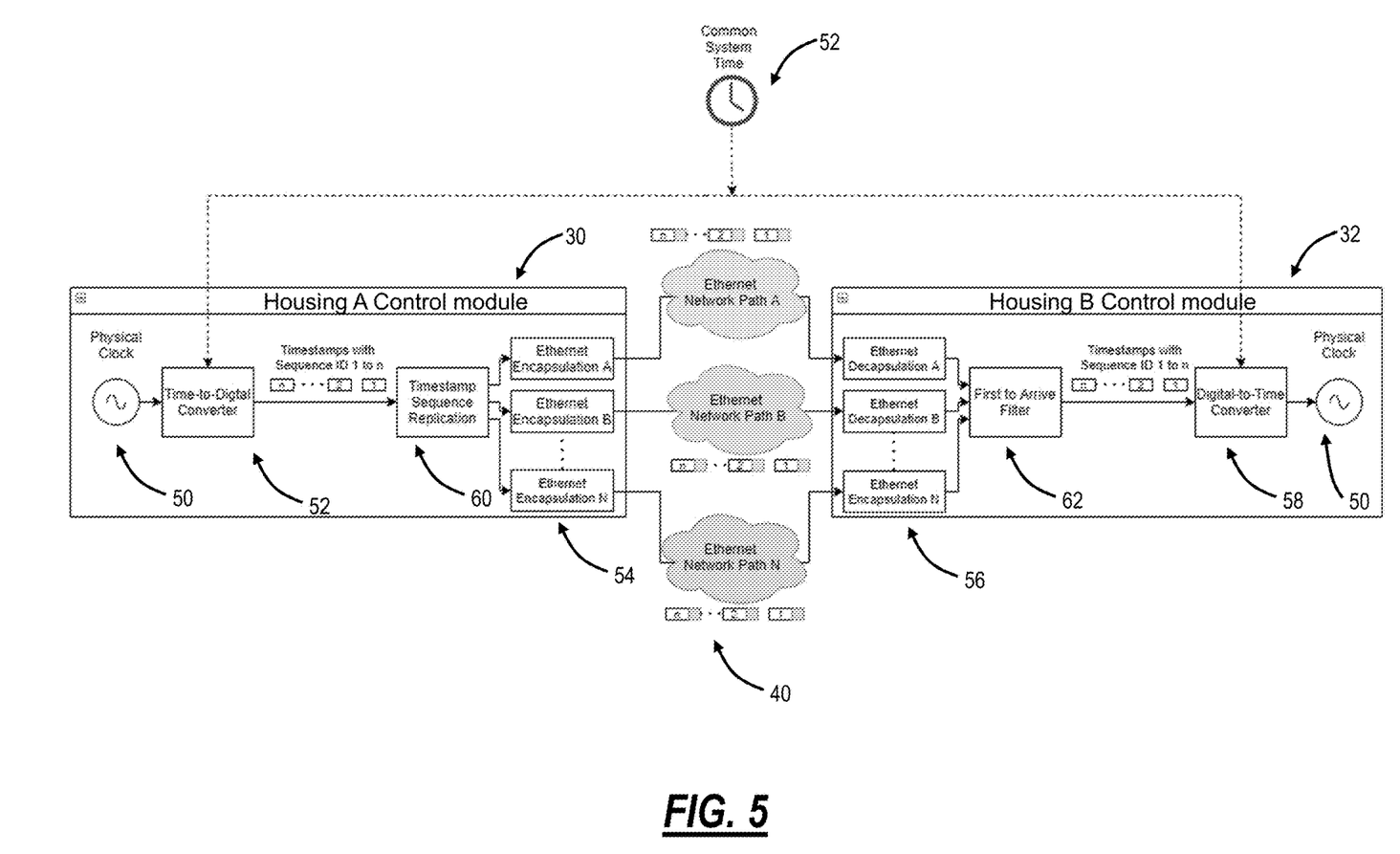
FIG. 5 is a diagram of digitized clock distribution between the control modules in the disaggregated network element with protection.

FIG. 5 is a diagram of digitized clock distribution between the control modules 30, 32 in the disaggregated network element with protection. FIG. 5 provides a similar example as FIG. 4 except the inter-housing Ethernet network 40 includes multiple Ethernet network paths A, B, . . . , N, where N≥2.

In the process of digitizing a clock, when each timestamp is generated by the time-to-digital converter circuit 52 connected to the physical clock 50, a monotonic sequence ID is created and associated with the timestamp. The timestamp and sequence ID pair is replicated by a timestamp sequence replication circuit 60 to create two or more identical copies, i.e., a number of identical copies for each of the N Ethernet network paths. Each copy can be encapsulated with a different ethernet header and/or sent to a different physical port, by the Ethernet encapsulation circuit 54, in order that each copy may take separate redundant paths through a network to arrive at the same destination.

The endpoint, i.e., the control module 32, receiving digitized clock packets and regenerating the physical clock is expected to receive all copies of the digitized clock packet, from the N Ethernet network paths. This includes the Ethernet decapsulation circuit 56 being connected to the Ethernet encapsulation circuit 54 over each of the N Ethernet network paths. The included sequence ID is used to determine whether a particular timestamp has already been received by a first to arrive filter circuit 62. When additional copies of the timestamp are detected, they are discarded. The first to arrive clock packet is used.

Of note, the various circuits 52, 54, 56, 58, 60, 62 are shown in FIG. 5 as logical functions. Those skilled in the art will recognize the circuits can be combined, discrete units, as well as combinations thereof.

With this scheme, the corruption of a single packet or the complete failure of a single path through the network will only result in the loss of one of the copies of the clock packet. The endpoint will continue to operate on whichever stream of clock packets is still active. Since sequence IDs are continually tracked, the endpoint can switch from one copy to the other seamlessly. This results in a hitless switchover on a network path failure.

From this point, the failed path will either recover, or an alternate path through the system will be found. When this occurs, the endpoint will begin to see all copies of the packet, and will continue to use whichever arrives first. This hitless "first to arrive" mechanism is simple to manage, as none of the network paths need to be managed as the "working" or "protected" path. This method also means that the logic receiving timestamps does not have to explicitly know about or react to a failure in the network.

Figure 6:
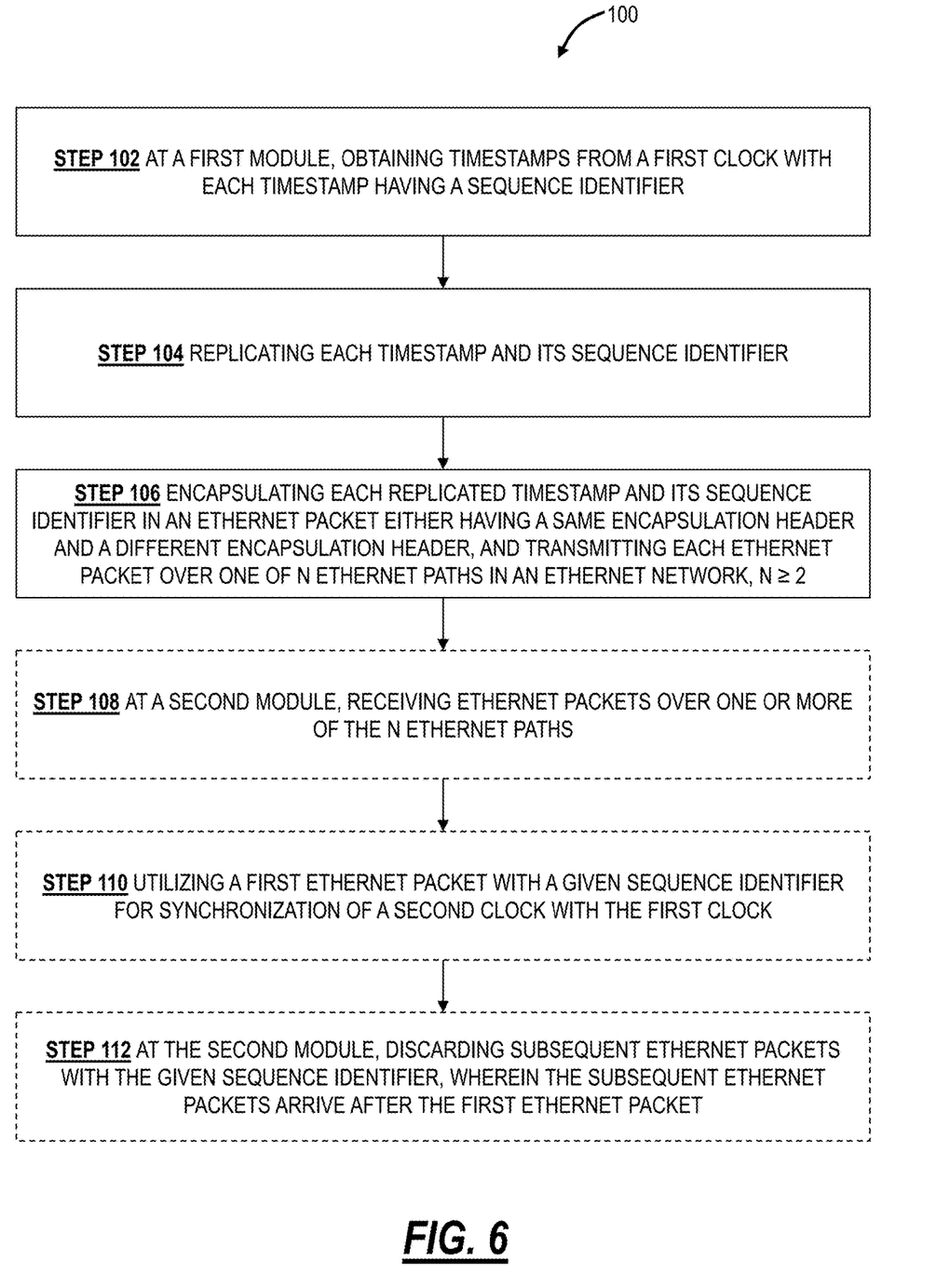
FIG. 6 is a flowchart of a process for digitized clock distribution with protection.

Note, the inter-housing Ethernet network 40 can include protection itself such as G.8032 Ethernet Ring Protection. While this can physically protect the Ethernet paths, G.8032 protection would be too slow, and would result in significant loss of clock packets during a switchover, which would cause a holdover event. The goal of the present disclosure is to switchover hitlessly when a link fails. That is, the process 100 can be implemented over the inter-housing Ethernet network 40 which can itself have physical layer protection.

The N Ethernet network paths can be non-overlapping/ physically exclusive. The N Ethernet network paths do not need to be latency-matched, but each path is required to have less latency than the sampling period of the clock packets (i.e., 10 KHz sampling rate, latency is required to be <100 μs). The process 100 is closer to "replication over alternate paths" as opposed to protection which usually has a selector. There is not a selector here as the first packet to arrive is used.

Process for Digitized Clock Distribution with Protection

FIG. 6 is a flowchart of a process 100 for digitized clock distribution with protection. The process 100 can be realized as a method having steps, a system including at least one processor and memory with instructions that, when executed, cause the at least one processor to implement the steps, via circuitry configured to implement the steps, and a non-transitory computer-readable medium having instructions stored thereon for programming at least one processor to perform the steps.

The process 100 includes, at a first module, obtaining timestamps from a first clock with each timestamp having a sequence identifier (step 102); replicating each timestamp and its sequence identifier (step 104); and encapsulating each replicated timestamp and its sequence identifier in an Ethernet packet either having a same encapsulation header and a different encapsulation header, and transmitting each Ethernet packet over one of N Ethernet paths in an Ethernet network, N≥2 (step 106).

The process 100 can include, at a second module, receiving Ethernet packets over one or more of the N Ethernet paths (step 108); and utilizing a first Ethernet packet with a given sequence identifier for synchronization of a second clock with the first clock (step 110). The process 100 can further include, at the second module, discarding subsequent Ethernet packets with the given sequence identifier, wherein the subsequent Ethernet packets arrive after the first Ethernet packet (step 112).

The Ethernet network can include underlying protection in addition to the replicating, such as G.8032, G.8031, etc. The first module and the second module can be included in a disaggregated network element. Each of the N Ethernet paths is non-overlapping and physically exclusive. Each of the N Ethernet paths is has a latency less than a sampling period of the obtaining.

CONCLUSION

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A system comprising:
    a first module comprising a first clock;
    a second module comprising a second clock; and
    an Ethernet network interconnecting the first module and the second module by N Ethernet paths, N≥2;
    wherein the first module is configured to provide timestamps encapsulated in replicated Ethernet packets to the second module over each of the N Ethernet paths for redundancy, and wherein each of the N ethernet paths has a latency less than a sampling period of the timestamps.

2. The system of claim 1, wherein the first module is configured to
    obtain timestamps from the first clock with each timestamp having a sequence identifier,
    replicate each timestamp and its sequence identifier, and
    encapsulate each replicated timestamp and its sequence identifier in a separate Ethernet packet and transmit each of the separate Ethernet packet over a respective one of the N Ethernet paths.

3. The system of claim 1, wherein the first module is configured to
obtain timestamps from the first clock with each timestamp having a sequence identifier,
replicate each timestamp and its sequence identifier, and
encapsulate each replicated timestamp and its sequence identifier in a separate Ethernet packet each with different encapsulation headers and transmit each of the separate Ethernet packet over a respective one of the N Ethernet paths.

4. The system of claim 1, wherein the second module is configured to
receive Ethernet packets over one or more of the N Ethernet paths; and
utilize a first Ethernet packet with a given sequence identifier for synchronization of the second clock with the first clock.

5. The system of claim 4, wherein the second module is configured to
discard subsequent Ethernet packets with the given sequence identifier, wherein the subsequent Ethernet packets arrive after the first Ethernet packet.

6. The system of claim 1, wherein the Ethernet network includes underlying protection in addition to the replicated Ethernet packets.

7. The system of claim 1, wherein the system includes a disaggregated network element.

8. The system of claim 1, wherein each of the N Ethernet paths is non-overlapping and physically exclusive.

9. A method of digitized clock distribution comprising steps of:
at a first module, obtaining timestamps from a first clock with each timestamp having a sequence identifier;
replicating each timestamp and its sequence identifier; and
encapsulating each replicated timestamp and its sequence identifier in an Ethernet packet either having a same encapsulation header and a different encapsulation header, and transmitting each Ethernet packet over one of N Ethernet paths in an Ethernet network, N≥2, wherein each of the N Ethernet paths has a latency less than a sampling period of the obtaining.

10. The method of claim 9, wherein the steps further include
at a second module, receiving Ethernet packets over one or more of the N Ethernet paths; and
utilizing a first Ethernet packet with a given sequence identifier for synchronization of a second clock with the first clock.

11. The method of claim 10, wherein the steps further include
at the second module, discarding subsequent Ethernet packets with the given sequence identifier, wherein the one or more Ethernet packets arrive after the first Ethernet packet.

12. The method of claim 9, wherein the Ethernet network includes underlying protection in addition to the replicating.

13. The method of claim 9, wherein the first module and the second module are included in a disaggregated network element.

14. The method of claim 9, wherein each of the N Ethernet paths is non-overlapping and physically exclusive.

15. A system comprising circuitry configured to:
obtain timestamps from a first clock with each timestamp having a sequence identifier,
replicate each timestamp and its sequence identifier, and
encapsulate each replicated timestamp and its sequence identifier in a separate Ethernet packet either having a same encapsulation header and a different encapsulation header, and transmitting each of the separate Ethernet packet over a respective one of the N Ethernet paths in an Ethernet network, N≥2, wherein each of the N Ethernet paths has a latency less than a sampling period of the obtained timestamps.

16. The system of claim 15, further comprising second circuitry configured to
receive Ethernet packets over one or more of the N Ethernet paths, and
utilize a first Ethernet packet with a given sequence identifier for synchronization of a second clock with the first clock.

17. The system of claim 16, wherein the second circuitry is further configured to
discard subsequent Ethernet packets with the given sequence identifier, wherein the one or more Ethernet packets arrive after the first Ethernet packet.

18. The system of claim 16, wherein the Ethernet network includes underlying protection in addition to the replicating.

* * * * *